Figure 1:
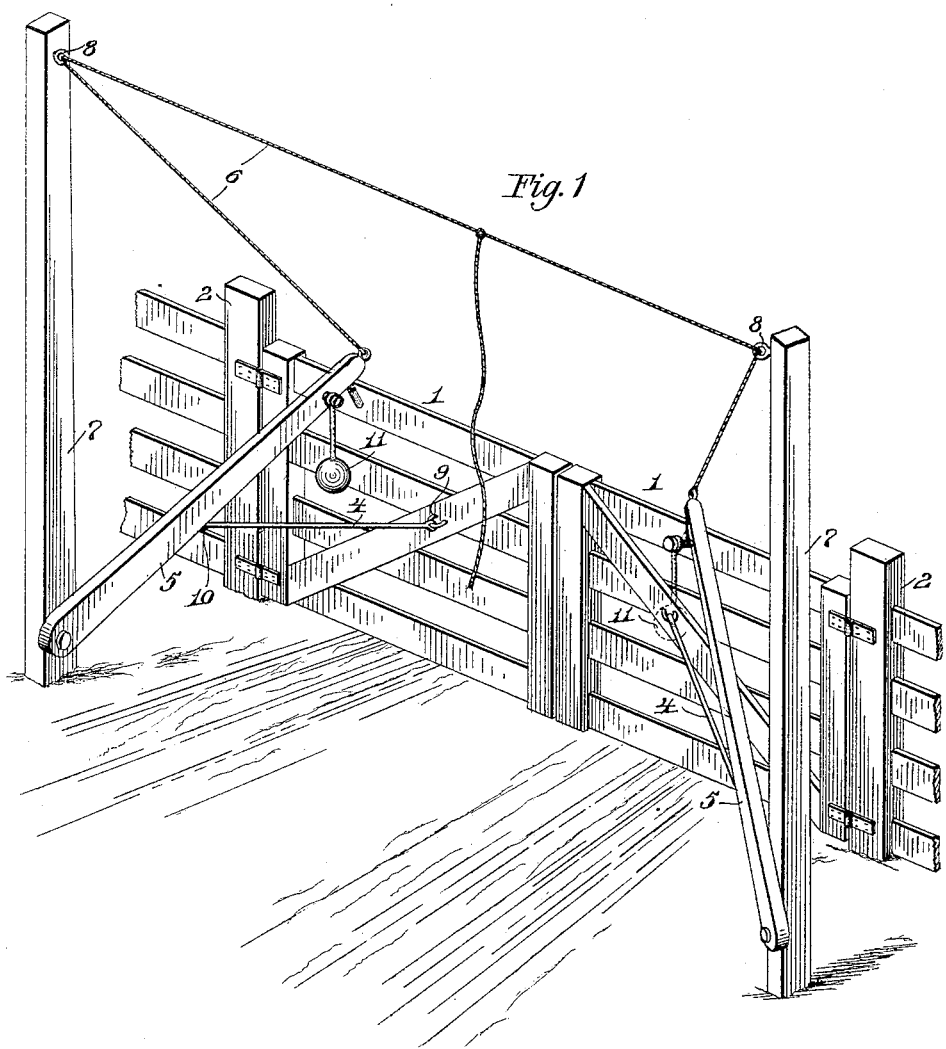

(No Model.) 2 Sheets—Sheet 1.

W. R. CHISHAM.
GATE OPENING DEVICE.

No. 462,690. Patented Nov. 10, 1891.

Witnesses
J. Ulke Jr.
R. W. Dayton

Inventor
Wm. R. Chisham
By his Attorneys

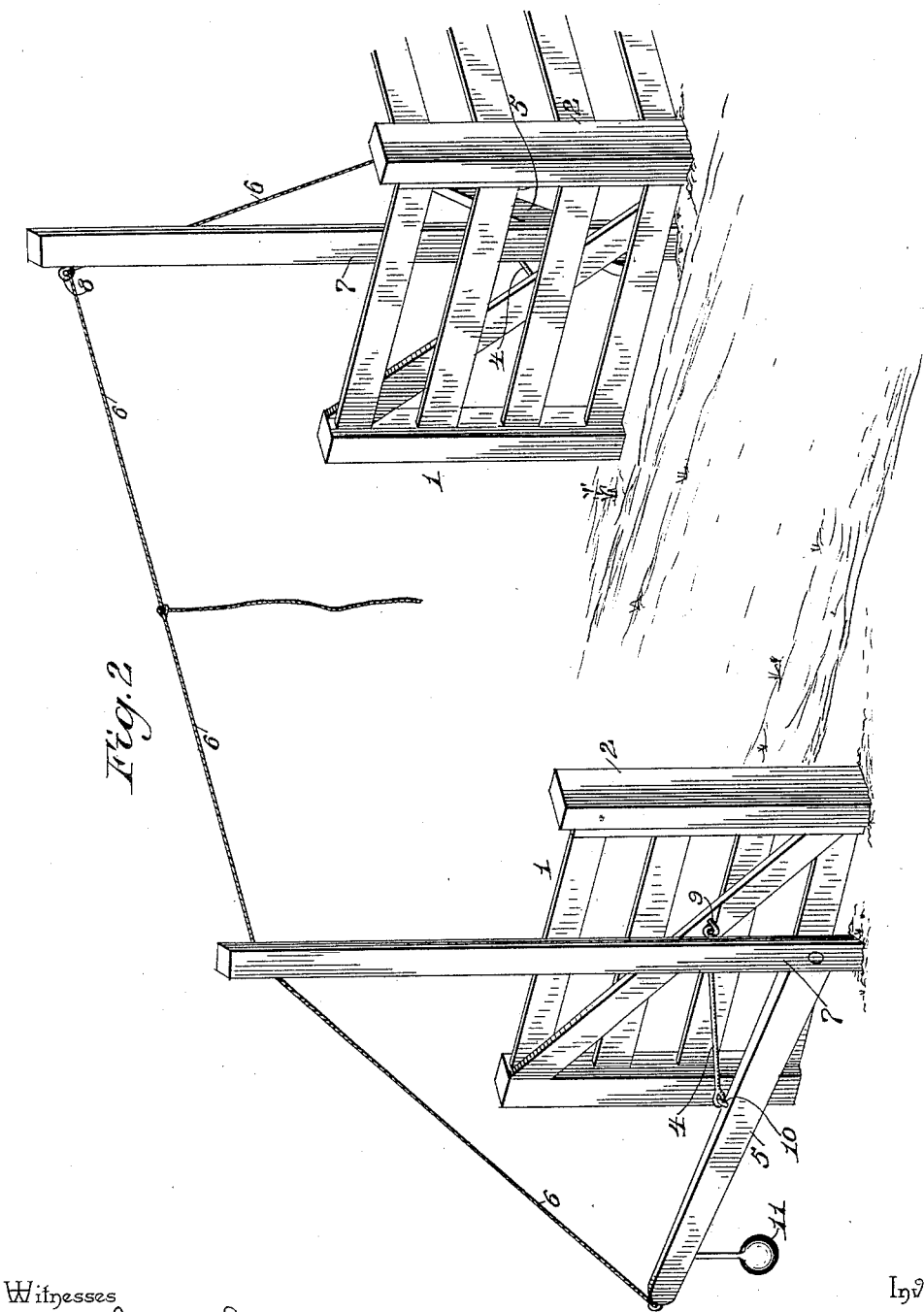

UNITED STATES PATENT OFFICE.

WILLIAM R. CHISHAM, OF HANNIBAL, MISSOURI, ASSIGNOR OF ONE-HALF TO SAMUEL E. ABBOTT, OF SAME PLACE.

GATE-OPENING DEVICE.

SPECIFICATION forming part of Letters Patent No. 462,690, dated November 10, 1891.

Application filed April 11, 1891. Serial No. 388,607. (No model.)

*To all whom it may concern:*

Be it known that I, WILLIAM R. CHISHAM, a citizen of the United States, residing at Hannibal, in the county of Marion and State of Missouri, have invented a new and useful Gate, of which the following is a specification.

The invention relates to improvements in swinging gates.

The object of the present invention is to simplify and improve the construction of swinging gates and to enable the same to be readily opened and closed without necessitating dismounting from an animal or vehicle, and also to enable the same to be readily opened from the ground.

The invention consists in the construction and novel combination and arrangement of parts, hereinafter fully described, illustrated in the accompanying drawings, and pointed out in the claims hereto appended.

In the drawings, Figure 1 is a perspective view of a gate constructed in accordance with this invention, the swinging levers being partially raised to open the gate. Fig. 2 is a similar view the gate being open.

Referring to the accompanying drawings, 1 designates a swinging gate of any desired construction hinged to a post 2 and connected by a rod 4 with a swinging lever 5. The swinging lever 5 is operated by a rope 6, and is pivoted at its lower end to a supporting-post 7, and the rope 6 passes through an eye or pulley 8, and has one end secured to the upper end of the swinging lever, so as when pulled upon to raise the swinging lever. As the swinging lever is raised by the rope it pulls upon the gate which is connected to it by the rod 4 and the gate is swung open. The momentum of the swinging lever is sufficient to carry the same beyond the perpendicular and cause the lever to fall on the opposite side of the supporting-post 7. The rod 4 is provided at its end with eyes which engage staples 9 and 10 of the swinging lever and the gate, and the staple of the swinging lever is arranged intermediate of the ends of the same, but may be adjusted along the lever to vary the leverage thereof according to the force required to open the gate.

The gate is held both in its closed and in its open position and the swinging lever is caused to fall positively by a swinging weight or pendulum 11, having its upper end pivoted to the upper end of the swinging lever. The swinging weight or pendulum 11 consists of a rod with a weight secured to its end, and the rod is provided at its upper end with an eye through which passes a bolt or screw to pivot the swinging weight or pendulum to the swinging lever.

It will be seen that the gate is simple and inexpensive in construction and is readily operated, either from the ground or from a horse or vehicle.

The gate-operating mechanism herein described is equally applicable to double or single gates. When employed on the former, a continuous rope is used, which has its ends secured to the ends of the swinging lever and passes through eyes at the upper ends of supporting-posts, and a central depending rope is employed to operate the gates.

What I claim is—

In a double swinging gate, the combination, with the gates 1, of the supporting-posts 7, provided with eyes 8, the swinging levers 5, pivoted to the posts 7, the rods 4, having one of their ends loosely connected to the gates and their other ends connected flexibly to the levers at an intermediate point of the latter, the swinging pendulous weights 11, having rods provided with eyes pivoted to the ends of the levers above the point of connection of the rods 4, and the rope 6, having its ends passed through the eyes 8 and connected to the extreme outer ends of the levers and provided with a depending extension arranged over the driveway, substantially as described.

In testimony that I claim the foregoing as my own I have hereto affixed my signature in presence of two witnesses.

WILLIAM R. CHISHAM.

Witnesses:
R. E. ANDERSON,
I. P. BARTUM.